April 19, 1932. P. O'MALEY 1,854,859
LAWN MOWER
Filed June 27, 1928
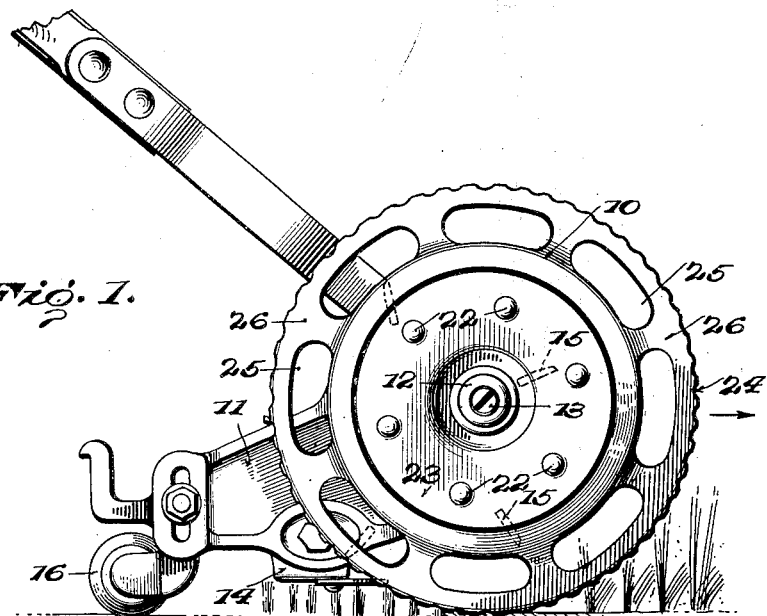
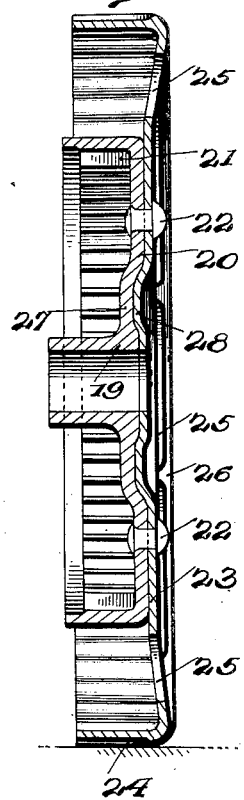
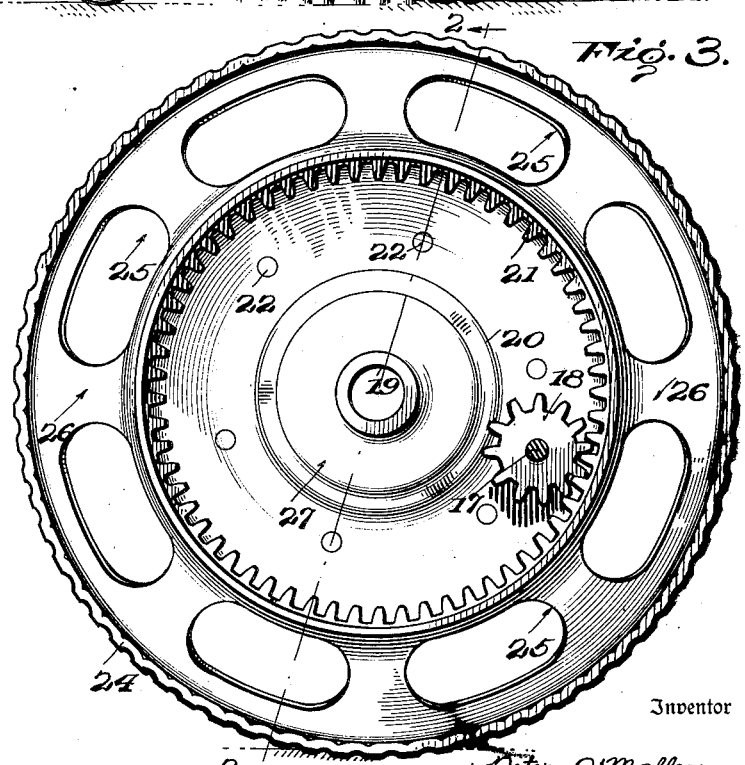
Inventor
Peter O'Malley.
By Cameron, Kerkam and Sutton.
Attorney Patented Apr. 19, 1932

1,854,859

UNITED STATES PATENT OFFICE

PETER O'MALEY, OF RICHMOND, INDIANA, ASSIGNOR TO F. & N. LAWN MOWER COMPANY, OF RICHMOND, INDIANA, A CORPORATION OF INDIANA

LAWN MOWER

Application filed June 27, 1928. Serial No. 288,752.

This invention relates to lawn mowers and more particularly to ground engaging wheels for lawn mowers.

Lawn mower wheels are subjected in use to heavy shocks through careless handling, use on stony ground, etc. Cast metal wheels have been found unsatisfactory for this service by reason of frequent fracture and chipping, and pressed metal wheels, while not readily subject to breakage are insufficiently rigid to form a proper support for the drive gear which must at all times be maintained in proper relationship to the driving pinion for the cutting reel in order that a satisfactory drive may be secured.

One of the objects of this invention is to provide a new and improved lawn mower drive wheel means which is stronger, lighter, cheaper and more durable than those heretofore known.

Another object is the provision of such a wheel and gear assembly in which an integral cast gear and shaft bearing is fixed to a pressed metal drive wheel so that the rigidity and cheapness of a cast gear and hub are combined with the toughness and resistance to shock of the pressed metal wheel.

Another object is the provision of such a device in which the gear and wheel are so interlocked as to prevent loosening thereof through shock in use.

A further object is the provision of such a device in which the meshing relation of the gear and driving pinion is not injuriously affected by such shock. Other objects will be in part obvious, and will in part appear as the description proceeds taken in connection with the illustrations in the drawings in which like reference characters are used to designate similar parts throughout the several figures thereof.

In the drawings:

Fig. 1 is a side view of a mower illustrating one embodiment of the present invention;

Fig. 2 is an enlarged sectional view of the ground engaging driving means shown in Fig. 1 take substantially on the line 2—2 of Fig. 3; and Fig. 3 is a side view of the mechanism shown in Fig. 2.

As shown in Fig. 1, the mechanism constituting the subject matter of the present invention may be employed in a hand mower of the type wherein a rotating cutting reel is actuated by ground engaging wheels, said reel being adapted to coact with a fixed knife bar. As illustrated, the novel ground engaging wheel, indicated generally by numeral 10, may be retained on a suitable bearing extending outwardly from a side plate 11 of the mower by any suitable means such as a washer 12 and screw 13. A knife bar 14 is adjustably supported in the side plates 11 in any desired manner in operative relationship with the blades 15 of a rotating cutter, and the rear ends of the side plates 11 are supported by a roller 16 which is adjustable in any suitable manner to regulate the height of the knife bar from the ground.

The rotating cutter is mounted on a shaft 17 which is suitably mounted at its ends in the side plates 11, and is driven by pinions 18 which are mounted on the shaft 17 and which drive the shaft through any preferred form of overrunning clutches (not shown). The pinion 18 derives its motion from the drive wheel 10, and the present invention relates particularly to the construction of the drive wheel 10 and its driving connection to the pinion 18.

Referring now particularly to Figs. 2 and 3 of the drawings, it will be seen that there is provided an integral cup-shaped casting comprising a hub 19, a web 20 and a peripheral internal gear 21. Fixed to the web of the hub and gear member 20 in any suitable manner as by means of the rivets 22, is a stamped-out cup-shaped metal member comprising a web 23 and a serrated rim 24 which is adapted when in assembled relation with the gear member to overlie and be arranged concentric with the gear member 21.

The web 23 is provided with a circular series of elongated openings 25 located radially between the periphery of the gear 21 and the rim 24 in order to form spokes 26 which, if desired, may be sufficiently weakened so that they will yield under a blow without transmitting sufficient force to the cast metal gear member to fracture the latter.

The web 20 of the gear member is provided with an annular depression 27, and the web 23 has stamped therein a corresponding protuberance 28, such depression and protuberance having correspondingly inclined shoulders which form an interlocking connection between the gear and rim members such that relative radial motion between the two will result in an axial separation thereof. It will thus be seen that blows on the rim 24 of the wheel are resisted by the interlocking connections. It results from this, that the main stresses on the rivets are tensile stresses which they are amply capable of withstanding. Loosening of the rivets in use is thus effectively prevented.

It will further be noted that even in the very unlikely case that the rivets should become loosened and the wheels should become loose with respect to the gears, that the proper alinement and distance of the gear 21 with respect to the pinion 18 is not in any way affected since gear 21 is formed integrally with bearing 19, so that the teeth of the gear and pinion do not become unduly worn or chipped.

It will thus be seen that there is herein provided a wheel and gear assembly for lawn mowers in which the gearing is effectively insulated from destructive shocks. Moreover, the wheel is not subject to fracture but, if deformed, may be readily bent back into shape, and is interlocked and firmly attached to the gear in such a manner as to maintain a permanent rigid connection.

Although but one embodiment of the invention has been shown and described in detail, it is to be expressly understood that the illustrated embodiment is not exclusive, and various other embodiments will now suggest themselves to those skilled in the art, while changes may be made in the details of construction, arrangement and proportion of parts, without departing from the spirit of this invention. Reference is therefore to be had to the claims hereto appended for a definition of the limits of the invention.

What is claimed is:

1. A driving wheel for lawn mowers comprising a cup-shaped cast gear member and a cup-shaped stamped rim member, the gear member being formed with a bearing hub a toothed rim and an integral web portion connecting the hub and rim, and the rim member being formed with a roughened traction surface, enveloping the gear rim, and an integral web portion fixed to the web of the gear member.

2. A driving wheel for lawn mowers comprising a cup-shaped cast gear member and a cup-shaped stamped rim member, the gear member being formed with a bearing hub a toothed rim and an integral web portion connecting the hub and rim, and the rim member being formed with a traction portion enveloping the gear rim and an integral web portion riveted to the web of the gear member, said webs having interfitting portions imparting axial movement between the parts under radial stress.

3. A driving wheel for lawn mowers comprising a cup-shaped cast gear member and a cup-shaped stamped rim member, the gear member being formed with a bearing hub a toothed rim and an integral web portion connecting the hub and rim, and the rim member being formed with a traction portion enveloping the gear rim and an integral web portion fixed to the web of the gear member, said rim web having openings formed therein between the traction portion and the gear rim to provide deformable spoke members.

4. A driving wheel for lawn mowers comprising a cup-shaped cast gear member and a cup-shaped stamped rim member, the gear member being formed with a bearing hub a toothed rim and an integral web portion connecting the hub and rim, and the rim member being formed with a traction portion enveloping the gear member, the rim member web having a central opening forming a continuation of the bearing surface of the gear hub.

5. A drive wheel for lawn mowers comprising a cup-shaped pressed steel rim portion having an axial opening, a cup-shaped cast metal internal gear portion having an axial hub, and means securing said gear portion within said rim portion with said opening in register with said hub.

6. A drive wheel for lawn mowers comprising a cup-shaped pressed steel rim portion having an axial opening, a cup-shaped cast metal internal gear portion having an axial hub registering with the said opening in the rim portion, the webs of said cup-shaped portions having correspondingly inclined shoulders, and means securing said gear portion within said rim portion with said shoulders in engagement and said opening registering with said hub.

In testimony whereof I have signed this specification.

PETER O'MALEY.